Sept. 30, 1930.　　　　H. HOWARD　　　　1,776,907

STORAGE DEVICE FOR VOLATILE LIQUIDS

Filed Nov. 5, 1926　　　2 Sheets-Sheet 1

Sept. 30, 1930.   H. HOWARD   1,776,907
STORAGE DEVICE FOR VOLATILE LIQUIDS
Filed Nov. 5, 1926   2 Sheets-Sheet 2
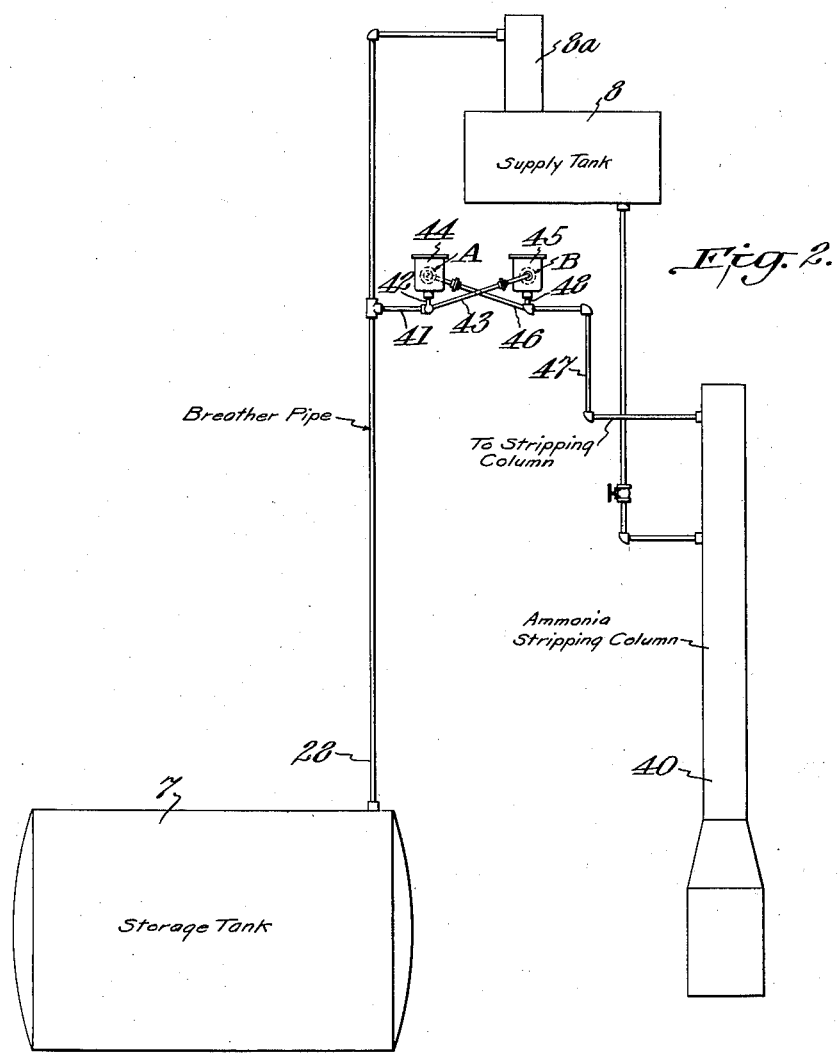
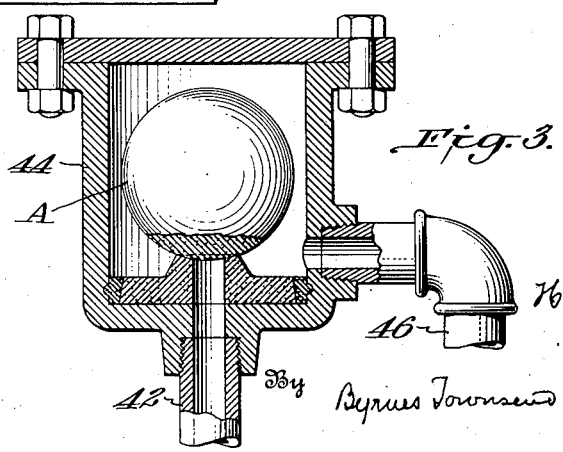

Patented Sept. 30, 1930

1,776,907

UNITED STATES PATENT OFFICE

HENRY HOWARD, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE

STORAGE DEVICE FOR VOLATILE LIQUIDS

Application filed November 5, 1926. Serial No. 146,544.

This invention relates to apparatus for storage and delivery to the places used of volatile liquids such as aqua ammonia, gasoline, benzol, etc.

The invention is particularly applicable in connection with a plant for oxidizing ammonia.

According to this invention there is provided automatic compensation for variations in pressure due to changes of temperature of the tanks in which the volatile liquids are contained, so that the escape of vapors from the tanks upon increase of temperature and the admission of outside air upon decrease of temperature are automatically prevented, unless a predetermined limit is exceeded.

The apparatus and its mode of operation will readily be understood from the accompanying drawing in which:

Fig. 2 is a diagrammatic illustration of a modified form of apparatus; and

Fig. 3 illustrates a detail.

Figure 1:
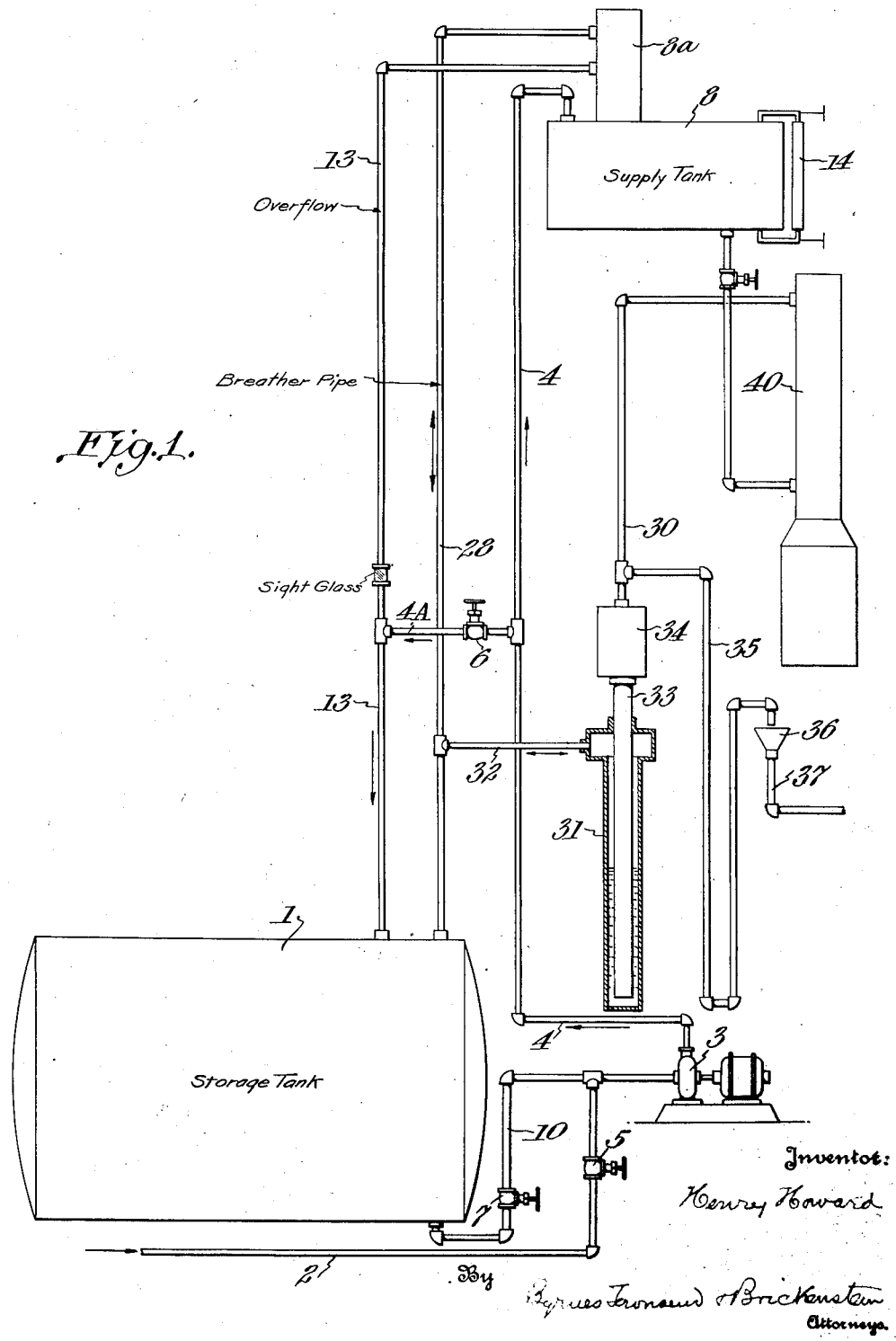
Fig. 1 is a diagrammatic illustration of the system.

Referring to Fig. 1, 1 is a storage tank, usually located outside the building. 8 is a supply tank to which liquid is delivered from the storage tank through pipe 10 provided with valve 7, pump 3 and pipe 4, valve 7 being open and valve 6 being closed. In case of overflow from tank 8 indication is given by sight glass in line 13. The tank 1 may be filled with liquid from the source of supply (not shown), as for example from a tank car, by means of pipe 2 provided with valve 5 leading to the pump 3. In filling the storage tank, the valve 5 is open and the valve 7 is closed, and the liquid is then delivered through pipe 4, past the open valve 6 and pipes 4ª and 13 leading into the top of the storage tank. The supply tank 8 is preferably provided with an upward extension 8ª to which is connected the overflow pipe 13 and the "breather pipe" 28. It is obvious that the supply tank 8 may be filled directly from the source of supply through the conduit 2. The breather pipe 28 connects the upper portion of the storage tank with the supply tank at a point above the level of the liquid therein. From this supply tank a pipe 28 and 32 leads to the top of a long, narrow, closed chamber 31 into which depends a pipe 33 of less diameter than the chamber 31. The chamber 31 is kept about half full of water or other suitable liquid. At its upper end the pipe 33 has an enlargement or separating chamber 34 from which extends upwardly a pipe 30 leading to any suitable portion of the apparatus in which the vapor from the liquid may be used, as, for example, the ammonia stripping column of an ammonia oxidation plant.

From the pipe 30 and above the chamber 34 leads downwardly extending pipe 35 forming a water seal which delivers into the funnel 36 and exit pipe 37. The operation of the device is as follows:

Suppose the temperature of the outside air surrounding the storage tank 1 is 60° F. and the temperature of the volatile liquid in the storage tank is 60° F. The system is then in equilibrium. Now the sun comes up, and beats upon the tank causing a considerable increase in temperature, thereby causing the expansion of the gas or vapors in the upper portion of the tank 1. The expanding vapors pass through pipe 32 into chamber 31 and exert a pressure on the top of the liquid which tends to lower its level in the chamber 31, and at the same time raise the level in 33, thereby counteracting the pressure within the tank corresponding to the difference in level between the liquid in chamber 31 and the pipe 33 or chamber 34. The pressure thus produced can be arranged to go to any point desired by varying the depth of the chamber 31 and pipe 33. The pressure thus produced in the chamber 31 is also transmitted through the pipe 28 to the supply tank, and the pressure on the surface of the liquid in both these tanks tends to prevent further evaporation of the volatile liquid in these tanks. This increased pressure may be so great as to cause the vapors passing through pipe 32 to force all the liquid out of chamber 31 and bubble up through pipe 33, but the parts are so proportioned that except under extreme conditions this result does not occur. Pipe 33, however, must be of sufficient internal diameter so that the escaping gas or vapor will not act as an "air lift".

In case of any excessive increase of temperature and pressure, sufficient to force the liquid out of chamber 31, it is forced through chamber 33 into chamber 34 where the vapor and liquid separate, the vapor passing by pipe 30 into for example the stripping column 40 of an ammonia oxidation plant and the liquid eventually returning into chamber 31. Chamber 34 is so proportioned to have more than enough room for all the liquid that can ever be held in chamber 31. Pipe 35 can be considered a safety valve for the system to prevent excessive pressure in case of stoppage of any of the pipes. It is never intended for operation under normal conditions in the system.

If the tank 1 is subjected to a lower temperature such as might occur during a cold night and the temperature drops say to 40–45° F., contraction would be caused both in the vapor and in the liquid, and in the absence of some such "breather" device, outside air would be sucked in. With the "breather" device connected to the system, however, the result of this diminution of pressure in the vapor spaces of the tanks is to depress the liquid in the pipe 33 and raise it in chamber 31. As under ordinary conditions this suction is not sufficient to drive the liquid down to the bottom of the chamber 33, no outside air is sucked in. This has the great advantage that during the next day when the increased temperature comes again, no outside air has been admitted into the system, and therefore there is none to be expelled.

The principle of operation is that as soon as the tank warms up, causing an expansion of its contents, this automatically increases the pressure on the surface of the liquid, thereby decreasing the tendency of the vapor to evaporate, and conversely, when the tank and its contents are cooling down a partial vacuum is created over the surface which tends to increase the rate of evaporation of the volatile component, thereby minimizing the suction produced by the cooling of the contents, the net result being that for all of the ordinary conditions there will not be pressure enough to force gas through the seal into the stripping column in the case of ammonia, or suction enough to pull air back through the seal.

These storage tanks are often of enormous size so that they might easily be collapsed by too much suction or distorted out of shape by too much pressure, and my invention prevents any such accidents.

Instead of the device shown in Figure 1, I may use the device shown in Figure 2. In this case the breather pipe 28 is connected through pipes 41, 42 and 43 to two chambers 44 and 45 in each of which are ball valves A and B, each of a suitable predetermined weight. The construction of these chambers will be evident from Figure 3. As there shown, the chamber 45 (and 44 is of the same construction) has an opening in the bottom connected to the pipe 42 and a valve seat 45 on which is mounted a ball A which may be of earthenware. The chamber 44 has another opening on the side connected to pipe 46, which is in turn connected to pipe 47 leading to the ammonia stripping column. If the pressure developed in the storage tank increases above the desired point, the ball will be raised and the pressure relieved, the vapors passing through pipes 46 and 47 to the stripping column 40.

If, on the other hand, the storage tank is cooled, thereby developing a suction in the breather pipe, this minus pressure will extend to the interior of the chamber 45 through pipe 41 and pipe 43 connected to the opening in the side of chamber 45 and when the suction exceeds the predetermined limit the external pressure acting through pipes 47 and 48 will be sufficient to raise the ball B, thereby permitting flow of external vapor or gas through pipes 43 and 41 to the breather pipe 28, thus preventing the development of any undue suction in the tanks connected to the breather pipe.

My invention, therefore, automatically prevents the development beyond a predetermined point of excess plus or minus pressures caused by variations in temperature of storage tank systems containing volatile liquids.

By properly proportioning the weights of the balls, the conditions of pressure or partial vacuum in the vapor space of the tanks can be controlled so that evaporation is lessened or increased until a predetermined point is reached, when automatic relief occurs.

I claim:

In combination, a closed storage tank and a closed supply tank for volatile liquids, a pipe connecting the vapor spaces of the tanks for equalizing the pressure of the vapors therein, and vapor pressure controlling means comprising a closed chamber adapted to be partially filled with liquid, a tube extending into the chamber and beneath the level of the liquid, and a pipe connecting the upper portion of the chamber with the pressure equalizing pipe.

In testimony whereof, I affix my signature.

HENRY HOWARD.